3,387,994
PROCESS FOR RENDERING GLASS SCRATCH RESISTANT BY DECOMPOSITION OF A TITANIUM ESTER CHELATE
Guthrie Raynor Dunton III, and Larry Quentin Green, Wilmington, Del., assignors to E. I. du Pont de Nemours and Company, Wilmington, Del., a corporation of Delaware
No Drawing. Filed Apr. 9, 1965, Ser. No. 447,072
6 Claims. (Cl. 117—124)

ABSTRACT OF THE DISCLOSURE

Process for rendering glass scratch resistant by spraying a heated glass surface with an inert, non-aqueous, organic solvent solution of a titanium ester complex and then cooling.

This invention is directed to an improved process for rendering glass scratch resistant, namely wherein the glass is sprayed with inert solvent solutions of specifically stabilized titanium esters.

U.S. Patent 2,831,780 proposes a method for rendering glass scratch resistant by treating the hot glass surface with the vapors of a volatile titanium compound, specifically the tetra esters of lower alcohols. This patent discloses a closed system for the glass treatment. The practical realties of glass manufacture however do not allow the use of a closed system. Glass objects, bottles, sheet, etc., are manufactured in continuous systems. Glass bottles, for example, after molding are placed directly on conveyor belts and transported directly to the annealing ovens (lehrs). This prior art process is, therefore, not practical since the glass bottles are never static and cannot be inclosed in a sealed system. If this process is used commercially, it must be used in an open system and when used in an open system, it has several well recognized deficiencies, namely (1) considerable titanium ester is lost due to reaction with atmospheric moisture and (2) control of coating thickness is difficult since there appears to be no practical method for controlling contact of the vapors with the glass surface.

Several methods have been proposed to overcome these deficiencies. Gray and Dettre, U.S. Patent 3,004,863, have proposed dipping the glass object into an aqueous solution of a titanium acetylacetone or ethyl acetoacetate complex, then heating to the annealing temperature. Gray and Dettre, U.S. Patent 3,051,593, proposed a similar process using titanium alkanolamine complexes and Brockett, Dettre and Gray, U.S. Patent 3,130,071, proposed using titanium lactic acid complexes. These proposed methods all suffer from one deficiency: it is necessary to cool the glass object after annealing to a point where contact with the aqueous solution will not cause shattering, then to reheat after treatment to the annealing temperature. Obviously, the glass manufacturer would rather avoid the necessity of reheating and cooling step.

Lytle, U.S. Patent 3,004,875, has disclosed spraying glass surfaces with organic solvent solutions of titanium salts, titanium acetate, among others, at temperatures above 400° F. This process suffers from the defficiency that the sprayed titanium compound does not lead to scratch resistant glass surfaces. For effective treatment, the titanium compound must be converted to titanium dioxide on the surface of the glass.

Orr, U.S. Patent 3,019,135, has disclosed spraying glass surfaces with aqueous solutions of metallic compounds and reducing agents. Orr's purpose was to obtain a conductive surface on the glass object. In addition to the undesirable effects of Lytle's process, the Orr process also produces some finely divided metal on the glass surface. While for his purposes this is permissible, for the present purposes it is not.

It is, therefore, an object of this invention to provide a commercially feasible, economical process for rendering glass scratch resistant using titanium ester vapors. It is a further object to provide a novel process which significantly overcomes the deficiencies of the prior art.

These and other objects of the invention will become apparent from the following description and claims.

More specifically, the present invention is directed to a process for rendering glass scratch resistant, wherein the improvement comprises spraying a glass surface heated at a temperature of at least 400° C. but insufficient to cause deformation with an inert, organic solvent solution of a titanium ester complex, then cooling; the titanium ester complex being the reaction product of one mole of a tetraalkyl titanate and at least one mole of a chelating agent chosen from $RCOCH_2COCH_3$, $$CH_3COCH_2CO_2R$$

$R'CH(OH)CO_2R$ and $ROCH_2CH_2OH$ wherein R is a lower alkyl group of one to six carbons having the structure

wherein each of X and Y are hydrogen or alkyl, and R' is H or R.

The present novel process consists of spraying the glass object, while heated at or above 400° C. temperature, with an inert organic solvent solution of certain titanium ester chelates. After the glass object has been sprayed, it is eventually cooled in the usual manner common to the annealing operation. Any further treatment necessary to obtain scratch resistance is then carried out.

In the usual manner of manufacture of glass objects, molten glass is molded or otherwise formed into the desired shape, then conveyed to an annealing oven (lehr) where it is cooled in a controlled manner to remove strain. The present process may be carried out at any time the glass is at a temperature above the annealing temperature, but below the deformation temperature. While at this temperature the glass object is sprayed with the titanium ester complex solution. The spray, for best results, should be in the form of small droplets such as obtained by atomization. Any spraying apparatus which will produce a sufficiently small state of subdivision is useful. After spray, the annealing of the glass object is completed.

It is immaterial in so far as the present process is concerned when the glass object is sprayed so long as the glass object is at the proper temperature. In practical glass fabrication operations, the glass objects are at the necessary temperatures from the time they leave the molding or forming operations until the stage of annealing where cooling begins. The spraying operation can therefore be carried out either between the molding or forming operation and annealing or during annealing. Since the present process involves volatilization of organic solvent, it is not practical to carry out the spraying operation in annealing oven (lehrs) which use open flames for heating as is usually the case. For this reason, it is preferred to carry out the present process between the molding or forming operation and annealing. As the present process is relatively rapid, the conveyor belts or the like carrying the glass objects from forming to annealing need not be slowed down or delayed.

The following three types of glass are representative of those that can be treated with the organic titanates to produce scratch resistant surfaces:

| Glass Type | Annealing Point, °C. | Softening or Deformation Point, °C. |
|---|---|---|
| Soda lime | 510 | 696 |
| Borosilicate | 555 | 820 |
| 96% Silica | 910 | 1,500 |

In the application of the titanates, the temperature of the glass should be at least 400° C. in order to achieve an efficient reaction of the titanate with the glass. In actual practice, the glass will usually be somewhat hotter, probably in the 500 to 600° C. range. The application should not be made at temperatures above the softening or deformation temperature. In this condition, the glass is semifluid and the surface skin of $TiO_2$ deposited will diffuse beneath the surface. This diffusion will not only cause loss of effectiveness, but can cause a haze to develop on the surface of the glass.

The Gray et al. and Brockett et al. patents referred to above have shown that titania coated glass objects, as are obtained in the present process, are not immediately scratch resistant on cooling. Gray et al. and Brockett et al. have suggested allowing the cooled glass objects to stand in open air for 20 minutes to obtain scratch resistance. Dettre et al., in U.S. Patent Nos. 3,161,631; 3,131,534; 3,161,535; 3,161,536; and 3,161,537 have suggested treating the glass objects, immediately after cooling, with certain olefinic compounds, carbonyl containing compounds or nitrogen containing organic compounds. Other materials which may also be used are naturally occurring waxes such as beeswax and ethylene oxide adducts of long chain organic acids such as stearic acid. Other useful materials for this purpose will probably be found. The mode of aftertreatment is not a part of the present process which is not limited to any particular mode of aftertreatment.

The use of a spraying method obviously overcomes the coating thickness problem of Deyrup since a spray can be controlled in both direction and amount. Spraying was suggested by both Lytle and Orr however and does not overcome all problems. Simple tetraalkyl titanate esters can be sprayed but these partially hydrolyze in the presence of atmospheric moisture before reaching the glass surface and hence are partially lost. The aqueous solutions of the complexes suggested by Gray et al. and Brockett et al. are also not useful for spraying as these complexes do hydrolyze at elevated temperatures in the presence of large amounts of water and are partially lost. In addition, spraying with aqueous solutions can cause cracking of the glass. Even where cracking does not occur, spraying with aqueous solutions does not give efficient or complete coverage of the glass surface. Instead the surface is heavily coated in certain areas and relatively uncoated in others.

Many different commercially available spray guns may be used. The following may be considered typical:

(a) Binks Manufacturing Company—Model 62 with Fluid Nozzle No. 61 and Air Nozzle No. 66SH; Model Wren A and B, Aspiration Type; Binks Humidifying Nozzle, Fluid J3B; Air R-6.

(b) Spraying Systems Company—Model 1/4 JM Aspiration Type with Fluid Nozzle No. 1650 and Air Nozzle No. 64.

It has now been found that spraying certain complexes of tetraalkyl titanates as solutions in inert, organic solvents leads to improved hydrolysis stability. Not all complexes of chelates of tetraalkyl titanates can be used for this purpose. Most complexes, for example, the alkanol amine complexes of Gray and Dettre and the lactic acid complexes of Brockett, Dettre and Gray, are not useful for spraying onto glass. While the present process is not limited to any theory of operation, the following seems to explain the results observed. It seems that the titanium compound must vaporize before contacting the glass surface. It also seems that a titanium ester chelate must dissociate during vaporization to the simple titanium ester to be effective. The present invention then seems to revolve around chelates which have sufficient hydrolytic stability to be useful but which will dissociate and the components vaporize near the surface of the hot glass.

It has now been found that four types of complexing or chelating agents are useful with tetraalkyl titanate esters for the purpose of spraying to obtain ultimately scratch resistant surfaces. These four types of complexing agents are of structure $RCOCH_2COCH_3$, (acylacetones), $CH_3COCH_2CO_2R$ (alkyl acetoacetates), $$R'CH(OH)CO_2R$$

(alkyl lactates) and glycolates $ROCH_2CH_2OH$ (2-alkoxyethanols) wherein R is a lower alkyl group of one to six carbons and R' is H or R. To obtain useful chelates, R must not be highly branched at the point of attachment to the remainder of the molecule. Thus R may be normal alkyl such as methyl, ethyl, propyl, butyl, isobutyl, amyl or hexyl or secondary alkyl such as isopropyl, sec.-butyl, 2-ethylbutyl or the like but R may not be tert-alkyl such as tert-butyl or tert-amyl. In other words, R must have the structure

where each of X and Y may be hydrogen or an alkyl. It is preferable that R be a normal alkyl and particularly methyl or ethyl.

Examples of such chelating agents are acetyl acetone, propionyl acetone, butyryl acetone, methyl acetoacetate, ethyl acetoacetate, butyl acetoacetate, hexyl acetoacetate, isopropyl acetoacetate, methyl glycolate, ethyl glycolate, butyl glycolate, sec.-butyl glycolate, methyl lactate, ethyl lactate, propyl lactate, isopropyl lactate, amyl lactate, methyl α-hydroxy butyrate, ethyl α-hydroxy butyrate, methyl α-hydroxy valerate, methyl α-hydroxy caproate, ethyl α-hydroxy caprylate, ethyl α-hydroxy isovalerate, methyl α-hydroxy isocaproate, 2-methoxyethanol, 2-ethoxyethanol, 2-propoxyethanol, 2-butoxyethanol, 2-amyloxyethanol, 2-hexyloxyethanol, 2-isopropoxyethanol and 2-(2'-ethylbutoxy) ethanol.

To obtain useful chelates, each mole of titanium ester must be reacted with at least one mole of chelating agent. When the chelating agent is $R'CH(OH)CO_2R$, $CH_3CH(OH)CO_2R$, or $HOCH_2CO_2R$ or $ROCH_2CH_2OH$, it is preferred to use two moles per mole of titanium ester. Although there seems to be no upper limit on the amount of chelating agent which may be used, it is preferred to use no more than four moles per mole of titanium ester. When more than four moles are used, a less efficient but operable process results.

The chelates are prepared by dissolving the titanium ester in the spraying solvent at the desired concentration, then adding the required quantity of the chelating agent. Usually it is desirable to use anhydrous solvents to avoid hydrolysis of the titanium ester before the chelating agent is added.

The concentration of titanium ester in the solution is chosen to give uniform coverage of the glass object. Generally, solutions containing from 1% to 10% titanium by weight are most useful. Greater or lesser amounts can be used but lead to either handling of excessively large amounts of solution or spraying problems with concentrated solutions. It is, of course, desired to obtain a uniform coating of titanium dioxide on the glass surface during this process. The amount of solution required to reach this end depends not only on the area of glass surface to be coated, but also the efficiency of the spraying device, i.e., the relative amount of material which does not reach the glass surface. The optimum concentrations and amounts of solution are best determined under the actual conditions of use.

The inert organic solvent can vary widely. The term inert indicates that the solvent does not react with the titanium ester or the hot glass surface in a detrimental manner. It does not imply that the solvents are non-flammable or otherwise nonreactive. Such solvents include liquid hydrocarbons and halogenated derivatives thereof and alcohols. Examples of useful solvents are hexane, heptane, octane, benzene, toluene, methylene chloride, n-propyl alcohol, n-butyl alcohol, methyl alcohol, ethyl alcohol and isopropyl alcohol. Isopropyl alcohol is preferred. In general solvents containing functional groups which react with titanium esters such as organic acids or amines and solvents containing two or more functional groups such as glycols and polyols, hydroxy acids and hydroxy amines are not useful. Acids of all kinds can cause polymerization of titanium esters.

The useful tetraalkyl titanates have the structures $Ti(OR')_4$ wherein $R'$ is an alkyl group of two to four carbons. Examples are tetraethyl titanate, tetraisopropyl titanate, tetrabutyl titanate, tetrahexyl titanate and tetra (2-ethylbutyl) titanate. Tetramethyl titanate is a solid which is insoluble in most solvents. Tetraisopropyl titanate is preferred. Long chain alkyl titanates are not efficient.

As indicated above, the present process is carried out by spraying the solution while the glass is at or above the annealing temperature but below the deformation temperature. Both the annealing and deformation temperatures vary with the type of glass being treated, as is well known in the art. Thus, for bottle glass, the useful range is about 510° to 670° C. For soft soda glass the annealing temperature is below 400° C., for borosilicate glass near 580° C.

The solvent used in the practice of the present invention with the titanate in the spray application will be essentially at room temperature. Of course, in the environment of a glass plant, the prevailing room temperature may be as high as 110° F.

The annealing process, after the titanante application, has essentially nothing to do with the effectiveness of the titanate treatment. It is carried out to prevent stresses from developing in the body of the glass on cooling. In commercial practice, an annealing period of approximately one-half to one hour is generally employed. This time, of course, will vary depending upon the size of the glass objects. Heavier glass articles will require a longer annealing period to prevent stresses from developing on cooling.

When droplets of tetraisopropyl titanate are directed toward a glass surface, at approximately 500 to 600° C., it is theorized that the latent heat in the glass causes the rapid vaporization of the liquid TPT. The resultant vapor then will react with the glass to provide the $TiO_2$ film. If the titanate is chelated in such a manner as to render it nonvolatile, as for example with triethanolamine, then the effectiveness of the treatment is greatly impaired. The glass will tend to be spotted indicating that some of the drops of fluid contacted the glass giving minute localized reactions. If, however, a chelate is chosen of the type that is readily reversible, that is one which the chelating agent itself is volatile, as are the acetyl acetone, ethyl lactate and 2-ethoxyethanol, then effective treatments can be obtained. It is theorized that these chelates, being reversible, are dissociated by the latent heat in the glass, regenerating ortho titanate vapors, which then can react uniformly with the glass surface to give a satisfactory coating.

If it was practical to make the applications at 0% relative humidity, the optimum product would no doubt be the tetraisopropyl titanate itself, since there would be no problem with hydrolysis caused by the prevailing atmospheric humidity. Under conditions normally encountered, however, more or less humidity is always present. This humidity will cause a prehydrolysis of the tetraisopropyl titanate before it has an opportunity to react with the glass. The chelating agents are added to retard this hydrolysis reaction, so that the ortho titanate may approach the vicinity of the glass in an essentially unhydrolyzed condition. These chelates, therefore, will give a highly efficiency of deposition during periods of high humidity.

The following examples illustrate but are not meant to limit the present invention. They illustrate the use of the present invention in the presence of atmospheric moisture particularly conditions of high relative humidity. It has been found that this invention is particularly useful when the relative humidity exceeds 75%.

EXAMPLE 1

In order to simulate the effects of prehydrolysis of the tetraisopropyl titanate in times of high humidity, an apparatus was set up in which the tetraisopropyl titanate was sprayed two to three inches above a tray of boiling water. A shallow pan 4½ inches x 8½ inches x 2 inches filled with water was placed between a glass vial at approximately 900° F. and the spray gun. A two-second duration application through the spray gun was then made of a solution of tetraisopropyl titanate 16.5% in isopropyl alcohol (titanium content 2.8%). Under these conditions, essentially no $TiO_2$ was deposited. After development with a soap solution, the glass vial was found to have a very poor degree of scratch resistance. It showed essentially no better scratch resistance than an untreated vial. In another application, the tetraisopropyl titanate was chelated with two moles of acetyl acetone. This composition, when sprayed to the vials under the same conditions and at the same titanium content (2.8%) in the solution, gave an excellent degree of deposition of the $TiO_2$, as evidenced by a reflective coat and a high degree of scratch resistance on development with a soap solution. A similar composition prepared from the tetraisopropyl titanate and two moles of ethyl acetoacetate applied from isopropyl alcohol at the same titanium level (2.8%), again gave an excellent degree of scratch resistance. Ethyl glycolate gives essentially identical results.

These experiments showed that certain chelating agents would be used to stabilize the tetraisopropyl titanate and carry it through an area of very high humidity and still achieve an effective deposition on glass.

EXAMPLE 2

Chelated products were prepared from tetra-n-butyl titanate by the addition of one mole and two moles of acetyl acetone. These products were applied by spraying under ambient atmospheric conditions and also by spraying through the saturated water atmosphere described in the previous example. The spray soluutions in isopropyl alcohol contained 4.2% titanium. The applications were made for periods of one second to small three-inch vials with the guns delivering solution at the rate of 1.3 g./minute. The treated vials were developed in soap solution and were found to be highly scratch resistant.

EXAMPLE 3

In another series of experiments, tetraisopropyl titanate was stabilized with acetyl acetone and in other examples with the chelating agents 2-ethoxyethanol and ethyl lactate.

Applications were made under both ambient atmospheric conditions (approximately 50% R.H.) and in the water-saturated atmosphere described in the earlier example. All applications were made from solutions containing 6.3% titanium; isopropyl alcohol was the solvent. In this series of applications, an aqueous dispersion of beeswax was used as the developing agent. Beeswax was the most efficient material found for developing the maximum degree of scratch resistance. Practically all of the treated vials showed good scratch resistance when examined in a dry condition. However, when the tests were made by flooding the surfaces with water, definite differences were established between the various treatments. The tests were made by immersing pairs of treated vials under water and then determining the pounds of force required to cause a seizure when one of the glass surfaces was moved over the other. Untreated glass surfaces were seized with forces of a pound or less. The results obtained are summarized in the following table:

| Titanate System | Wet Scratch Resistance [1] (Lbs.) | |
|---|---|---|
| | Ambient Conditions (Less than 60% R.H.) | Through Water-Saturated Atmosphere |
| Tetraisopropy titanate (TPT) | 5–10 | 5–10 |
| TPT plus 1 mole 2-ethoxyethanol | 5–10 | 5–10 |
| TPT plus 2 moles 2-ethoxyethanol | 10–20 | 10–20 |
| TPT plus 4 moles 2-ethoxyethanol | 30–40 | 20–30 |
| TPT plus 1 mole ethyl lactate | 10–20 | 5–10 |
| TPT plus 2 moles ethyl lactate | >40 | 30 |
| TPT plus 4 moles ethyl lactate | >40 | >40 |
| TPT plus 2 moles acetyl acetone | >40 | >40 |

[1] Titanates were spray applied in isopropyl-alcohol solutions containing 6.3% titanium, using a Binks Model 62 spray gun and a one-second spray interval. The gun was adjusted to deliver 1.8 g. solution per minute.

These data showed that stabilization of the basic orthotitanate with a chelating agent, acetyl acetone, or the chelating solvents, 2-ethoxyethanol and ethyl lactate, provide sufficient stabilization so that effective treatments can be obtained on the glass surfaces, even when sprayed through a moisture laden atmosphere.

EXAMPLE 4

A large number of alternative chelating agents were examined using procedures described in the previous examples. The spray application of these products, although in some instances giving improvements over that of the tetraisopropyl titanate itself, were not as good as that obtained with the chelating agents claimed by this invention. Some of these are chelating agents which were tried and found inferior as follows: ethanolamine, triethanolamine, diacetone alcohol, tetrahydrofurfuryl alcohol, diethylmalonate, α,α-acetylcyanoethane, tetrahydrofuran, 1,4-butanediol, 2,3-butanediol and 1,2-propanediol.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are as follows:

1. A process for rendering a glass surface scratch resistant which comprises heating said glass surface to a temperature of at least 400° C. but insufficient to cause deformation, spraying said heated glass surface with an inert, non-aqueous, organic solvent solution of a titanium ester complex which dissociates during vaporization at said temperature to the titanium ester which is converted to titanium dioxide on said glass surface, and cooling said glass surface; the titanium ester complex being the reaction product of one mole of a tetraalkyl titanate and at least one mole of a chelating agent selected from the group consisting of $RCOCH_2COCH_3$, $CH_3COCH_2CO_2R$, 

$$R'CH(OH)CO_2R$$

and $ROCH_2CH_2OH$ wherein R is a lower alkyl group of one to 6 carbons having the structure

wherein each of X and Y are selected from the group consisting of hydrogen and alkyl, and R' is selected from the group consisting of H and R.

2. A process according to claim 1 wherein the organic solvent is selected from the group consisting of hydrocarbons, halogenated hydrocarbons and alcohols.

3. A process according to claim 2 wherein the solvent solution contains 1 to 10% by weight titanium.

4. A process according to claim 3 wherein said chelating agent is $CH_3COCH_2COCH_3$.

5. A process according to claim 3 wherein said chelating agent is $C_2H_5OCH_2CH_2OH$.

6. A process according to claim 3 wherein said chelating agent is $CH_3CH(OH)CO_2C_2H_5$.

References Cited

UNITED STATES PATENTS

| | | | |
|---|---|---|---|
| 2,831,780 | 4/1958 | Deyrup | 117—124 |
| 3,004,863 | 10/1961 | Gray et al. | 117—124 X |
| 3,051,593 | 8/1962 | Gray et al. | 117—124 |
| 3,130,071 | 4/1964 | Brockett et al. | 117—124 |
| 3,161,535 | 12/1964 | Dettre | 117—69 |
| 3,202,054 | 8/1965 | Mochel | 117—71 |
| 3,323,889 | 6/1967 | Carl et al. | 117—24 |

RALPH S. KENDALL, *Primary Examiner.*

ALFRED L. LEAVITT, *Examiner.*

H. COHEN, *Assistant Examiner.*